US010183404B2

(12) United States Patent
Yim

(10) Patent No.: US 10,183,404 B2
(45) Date of Patent: Jan. 22, 2019

(54) LINEAR MOTION DEVICE WITH EXTENDING TUBE FOR POSITIONING

(71) Applicant: THE TRUSTEES OF THE UNIVERSITY OF PENNSYLVANIA, Philadelphia, PA (US)

(72) Inventor: Mark Yim, St. Davids, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 154 days.

(21) Appl. No.: 15/105,264

(22) PCT Filed: Jan. 23, 2015

(86) PCT No.: PCT/US2015/012609
§ 371 (c)(1),
(2) Date: Jun. 16, 2016

(87) PCT Pub. No.: WO2015/112815
PCT Pub. Date: Jul. 30, 2015

(65) Prior Publication Data
US 2017/0001314 A1    Jan. 5, 2017

Related U.S. Application Data

(60) Provisional application No. 61/931,212, filed on Jan. 24, 2014.

(51) Int. Cl.
*B25J 18/02* (2006.01)
*F16H 19/06* (2006.01)
(Continued)

(52) U.S. Cl.
CPC ............... *B25J 18/02* (2013.01); *B25J 9/104* (2013.01); *F16H 19/064* (2013.01); *G01M 13/028* (2013.01); *G01M 13/045* (2013.01)

(58) Field of Classification Search
CPC ......... B25J 18/02; B25J 9/104; F16H 19/064; G01M 13/045; G01M 13/028
(Continued)

(56) References Cited

U.S. PATENT DOCUMENTS 2,173,685 A    1/1939 Grossmann
2,276,524 A    7/1939 Taylor
(Continued)

FOREIGN PATENT DOCUMENTS

CA    2 821 292    1/2015
CN    1989066 A    6/2007
(Continued)

OTHER PUBLICATIONS

International Preliminary Report on Patentability and Written Opinion of the International Searching Authority for International Application No. PCT/US2015/012609 dated Jul. 26, 2016, 5 pages.
(Continued)

*Primary Examiner* — Jaime Figueroa
(74) *Attorney, Agent, or Firm* — Baker & Hostetler LLP

(57) ABSTRACT

Linear motion devices that may include a band configured to be helically interlinked into a tube, where the band includes a plurality of protrusions and a plurality of recesses that engage the plurality of protrusions to link the band with itself. The linear motion devices also include a sliding guide configured to link and unlink the band, where the sliding guide includes an outer layer, an inner layer, and a ramp between the outer and inner layers having a helical incline to support a bottom portion of the band. The linear motion devices include a driving mechanism that is in contact with the band, the driving mechanism configured to move the band through the sliding guide up the helical incline to link the band, thereby extending the tube, and to move the band
(Continued)

through the sliding guide down the helical incline to unlink the band, thereby retracting the tube.

20 Claims, 8 Drawing Sheets

(51) Int. Cl.
*G01M 13/04* (2006.01)
*G01M 13/02* (2006.01)
*B25J 9/10* (2006.01)

(58) Field of Classification Search
USPC .................................................. 700/245, 258
See application file for complete search history.

(56) References Cited

U.S. PATENT DOCUMENTS

| | | | |
|---|---|---|---|
| 2,742,728 A | 7/1954 | Boyd | |
| 3,213,573 A | 10/1965 | Bohr et al. | |
| 3,967,663 A | 7/1976 | Loigerot | |
| 4,663,925 A | 5/1987 | Terada | |
| 4,813,171 A | 3/1989 | Cooper et al. | |
| 5,168,679 A | 12/1992 | Featherstone | |
| 5,317,952 A | 6/1994 | Immega | |
| 5,765,320 A | 6/1998 | Hamy | |
| 5,798,457 A | 8/1998 | Paulson | |
| 6,112,474 A | 9/2000 | Paine | |
| 6,290,377 B1 | 9/2001 | Hulse | |
| 6,299,336 B1 | 10/2001 | Hulse | |
| 6,530,177 B1 | 3/2003 | Sorensen | |
| 6,971,203 B1 | 12/2005 | Foor et al. | |
| 7,082,722 B1* | 8/2006 | Sorensen | F16H 49/00 49/324 |
| 7,213,796 B2 | 5/2007 | Laforest | |
| 7,270,619 B2 | 9/2007 | Boure'His | |
| 7,596,820 B2 | 10/2009 | Nielsen et al. | |
| 7,654,214 B2 | 2/2010 | Rupp, II | |
| 7,874,695 B2 | 1/2011 | Jensen | |
| 7,926,371 B2 | 4/2011 | Nielsen | |
| 7,932,687 B2 | 4/2011 | Bastholm | |
| 8,011,260 B2* | 9/2011 | Scott | B66D 1/54 74/89.2 |
| 8,028,510 B2* | 10/2011 | Scott | F16G 13/20 174/72 A |
| 8,074,931 B2* | 12/2011 | Schroeder | B64D 39/02 244/1 TD |
| 8,234,010 B2 | 7/2012 | Thompson et al. | |
| 8,303,143 B2 | 11/2012 | Webb | |
| 8,381,501 B2 | 2/2013 | Koselka et al. | |
| 8,439,311 B2 | 5/2013 | Richardson, Jr. | |
| 8,500,202 B2 | 8/2013 | Nielsen et al. | |
| 8,555,431 B2 | 10/2013 | Nielsen | |
| 8,904,722 B2* | 12/2014 | Smith | E04H 12/16 52/114 |
| 9,267,640 B2 | 2/2016 | Woodruff et al. | |
| 2006/0005651 A1 | 1/2006 | Laforest | |
| 2009/0026018 A1 | 1/2009 | Kempf | |
| 2009/0308187 A1 | 12/2009 | Schmid | |
| 2011/0126650 A1 | 6/2011 | Sorensen | |
| 2011/0272375 A1 | 11/2011 | Willim | |
| 2011/0308174 A1 | 12/2011 | Meyer | |
| 2012/0095596 A1* | 4/2012 | Cole | B25J 9/06 700/253 |
| 2013/0300537 A1 | 11/2013 | Bajo et al. | |
| 2014/0293121 A1 | 10/2014 | Rijken et al. | |
| 2016/0064263 A1* | 3/2016 | Hosek | H01L 21/67259 414/744.5 |

FOREIGN PATENT DOCUMENTS

| | | |
|---|---|---|
| CN | 102203462 A | 9/2011 |
| DE | 3804193 A1 | 8/1989 |
| EP | 1165921 B1 | 1/2003 |
| ES | 1096630 | 12/2013 |
| SU | 1299676 A1 | 3/1987 |
| WO | 00/43768 A1 | 7/2000 |
| WO | WO 02/43230 | 5/2002 |
| WO | 2009/026018 A2 | 2/2009 |
| WO | 2015/067699 A1 | 12/2013 |

OTHER PUBLICATIONS

International Search Report and Written Opinion for PCT/US15/12609 dated Jun. 26, 2015.
Natural Frequency of Vibration Gives Precise Tension in Wires, Nov. 11, 2004, Tom Shelley, 1-6.

* cited by examiner

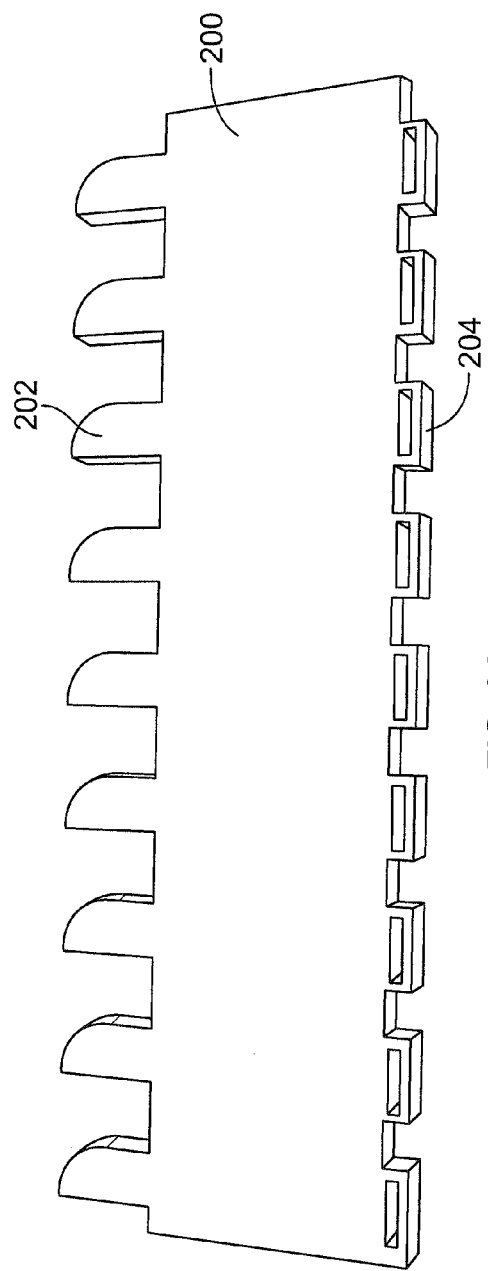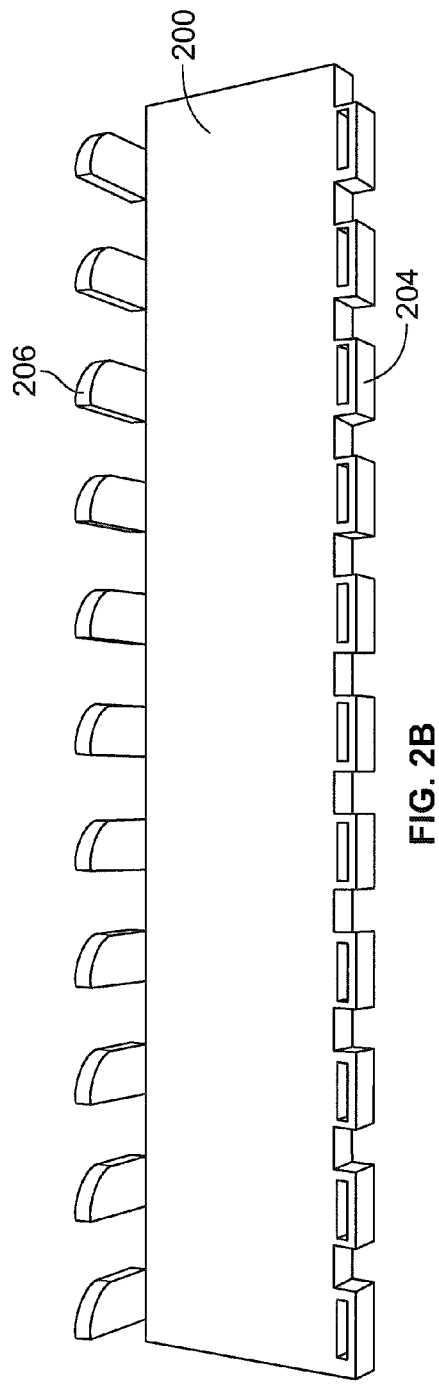

LINEAR MOTION DEVICE WITH EXTENDING TUBE FOR POSITIONING

CROSS REFERENCE TO RELATED APPLICATIONS

This application is the U.S. national phase application of International Patent Application No. PCT/US2015/012609 filed Jan. 23, 2015, titled "LINEAR MOTION DEVICE WITH EXTEDNING TUBE FOR POSITIONING," which claims priority to U.S. Provisional Application No. 61/931,212, titled "LINEAR MOTION DEVICE WITH EXTENDING TUBE FOR POSITIONING," filed on Jan. 24, 2014, the entirety of all are incorporated by reference herein.

FIELD OF THE INVENTION

The present invention relates to linear motion devices with extending tubes for positioning.

BACKGROUND OF THE INVENTION

Linear motion devices are used in a variety of fields and are advantageous due to their compactness in non-extended positions and strength in extended positions. Such devices typically utilize complex, expensive, and heavy structures to function for their intended uses. There is a need for low-cost, high-strength, and simple linear motion devices that can be used in fields such as robotics.

SUMMARY OF THE INVENTION

Aspects of the invention are embodied in linear motion devices. The linear motion devices may include a band configured to be helically interlinked into a tube, where the band includes a plurality of protrusions and a plurality of recesses that engage the plurality of protrusions to link the band with itself. The linear motion devices may also include a sliding guide that is configured to link and unlink the band, where the sliding guide also includes an outer layer, an inner layer, and a ramp between the outer and inner layers, the ramp having a helical incline to support a bottom portion of the band. The linear motion devices may also include a driving mechanism that is in contact with the band, where the driving mechanism is configured to move the band through the sliding guide up the helical incline to link the band, thereby extending the tube, and is configured to move the band through the sliding guide down the helical incline to unlink the band, thereby retracting the tube.

Further aspects of the invention are embodied in positioning devices. The positioning devices include a linear motion device comprising a structure configured to expand and contract along a linear direction, a base, at least one base joint connecting the linear motion device to the base, and at least one cable connected between a distal end of the linear motion device and the base. The at least one cable may be actuated by at least one winch positioned between the base and the distal end of the tube.

Further aspects of the invention are embodied in methods method for determining whether contact is made on a cable in a positioning device. The methods include the steps of determining, by a processor, a natural vibration frequency of the cable, sensing, by at least one vibration sensor, a current dominant vibration frequency of the cable, comparing, by a processor, the sensed current dominant vibration frequency of the cable with the natural vibration frequency of the cable, and determining, by a processor and based on the comparing step, a discrepancy between the sensed current dominant vibration frequency and the natural vibration frequency of the cable to indicate contact.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. The various features of the drawings are not drawn to scale. On the contrary, the dimensions of the various features are arbitrarily expanded or reduced for clarity. Included in the drawings are the following figures:

FIGS. 2A and 2B depict a castellated band according to aspects of the invention;

DETAILED DESCRIPTION OF THE INVENTION

Figure 1A:
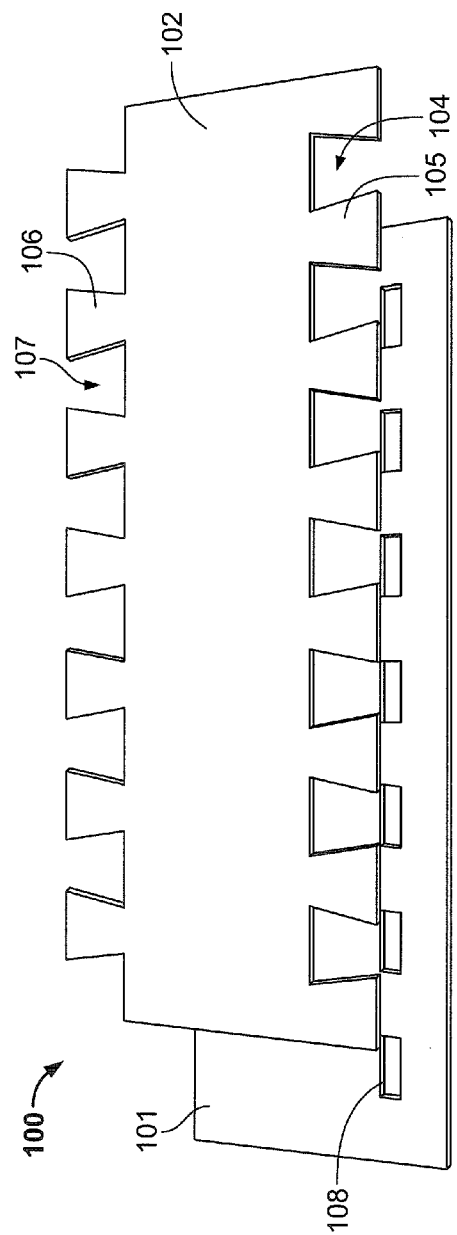
FIGS. 1A-1B depict a multi-layered band in an unassembled state (FIG. 1A) and an assembled state (FIG. 1B) to be helically wound in a zipper-like structure according to aspects of the invention.
Figure 1B:
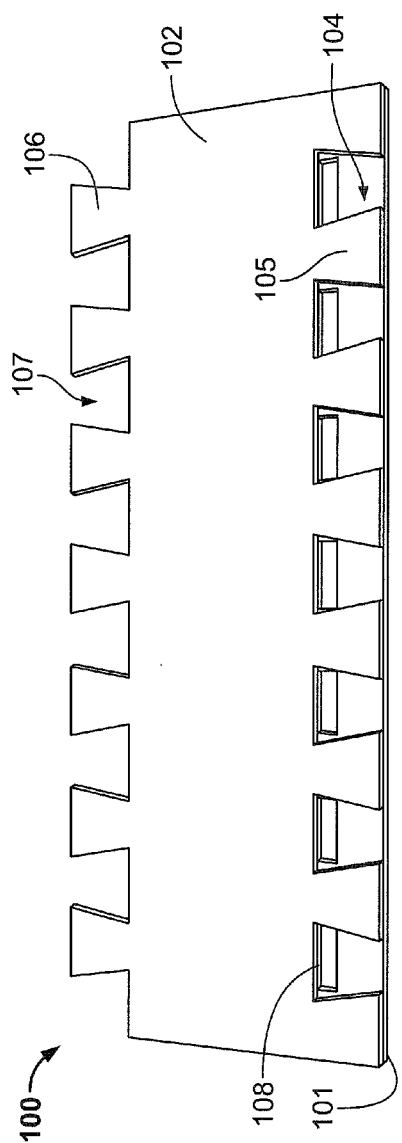

Referring to FIGS. 1A and 1B, a band 100 for use in a linear motion device is shown. The illustrated band 100 includes multiple layers 101, 102. The band 100 may be constructed of steel-based materials, polymer-based materials, etc., and may be produced utilizing roll-to-roll processes. Other suitable materials and processes for constructing the band 100 will be understood by one of skill in the art from the description herein.

In the illustrated embodiment, the band 100 has an inner layer 101 and an outer layer 102 disposed over the inner layer 101. A top portion of the outer layer 102 includes a plurality of top protrusions 106 and a plurality of top recesses 107. A bottom portion of the outer layer 102 includes a plurality of bottom recesses 104 and a plurality of bottom protrusions 105. The inner layer 101 includes a plurality of slots 108 configured to be engaged by teeth from a driving mechanism as will be described with reference to FIGS. 4-6. These slots can also be in outer layer 102 or both inner and outer layers 101 and 102. The shape of the slot may be substantially larger than the teeth from the driving mechanism 308 (FIG. 3) to facilitate engagement by the teeth In other embodiments, the band 100 may be a single layer. In accordance with this embodiment, the slots 108 may be formed distinct from the protrusions/recesses or may be integrated within the protrusions recesses (e.g., the recesses 104, 107 and protrusions 105, 106 may be sized such that a slot remains within the recesses 104, 107 when a protrusion 105, 106 is inserted. The band 100 is formed of a desired length to be helically interlinked with itself into a tube. The illustrated tube formed by interlinking the band 100 with itself has a circular cross section. Other cross sections are contemplated, e.g., oval. The recesses 104 receive the protrusions 106 and recesses 107 receive protrusions 105, forming an interlinked zipper-like tube structure that remains linked under both tensile and compressive forces. The band 100, depicted in FIGS. 1A and 1B, is configured for in-plane interlinking (e.g., the protrusions 105 and 106 remain in substantially the same plane as the band 100 when received by the recesses 104 and 107). In embodiments where the band 100 is configured for in-plane interlinking, the geometries of the protrusions 105, 106 and recesses 104, 107 may be of a shape that remains linked under tensile and compressive forces, such as trapezoidal as depicted in FIGS. 1A and 1B. Alternatively, the protrusions 105, 106 and recesses 104, 107 may be square, rectangular, circular, cross-shaped, tetrahedral, etc. Other suitable geometries for the protrusions 105, 106 and recesses 104, 107 will be understood by one of skill in the art from the description herein. Referring to FIGS. 2A and 2B, an alternative band 200 for use in linear motion devices is depicted. The illustrated band 200 is configured for out-of-plane interlinking (e.g., the protrusions 202 extend out of the plane of the band 200 when interlinked). The band 200 includes castellated protrusions 202 formed on the top portion and openings 204 formed on the bottom portion. The castellated protrusions 202 can be manufactured by bending the protrusions 206, as depicted in FIG. 2B. When the band 200 is helically interlinked, the bent castellated protrusions 206 are pushed into the openings 204 to interlink out-of-plane with the band 200. The protrusions 202, 206 may be shaped to compensate for errors in positioning. The openings 204 may be formed as slots, holes, or other shapes anywhere on the band.

Figure 3:
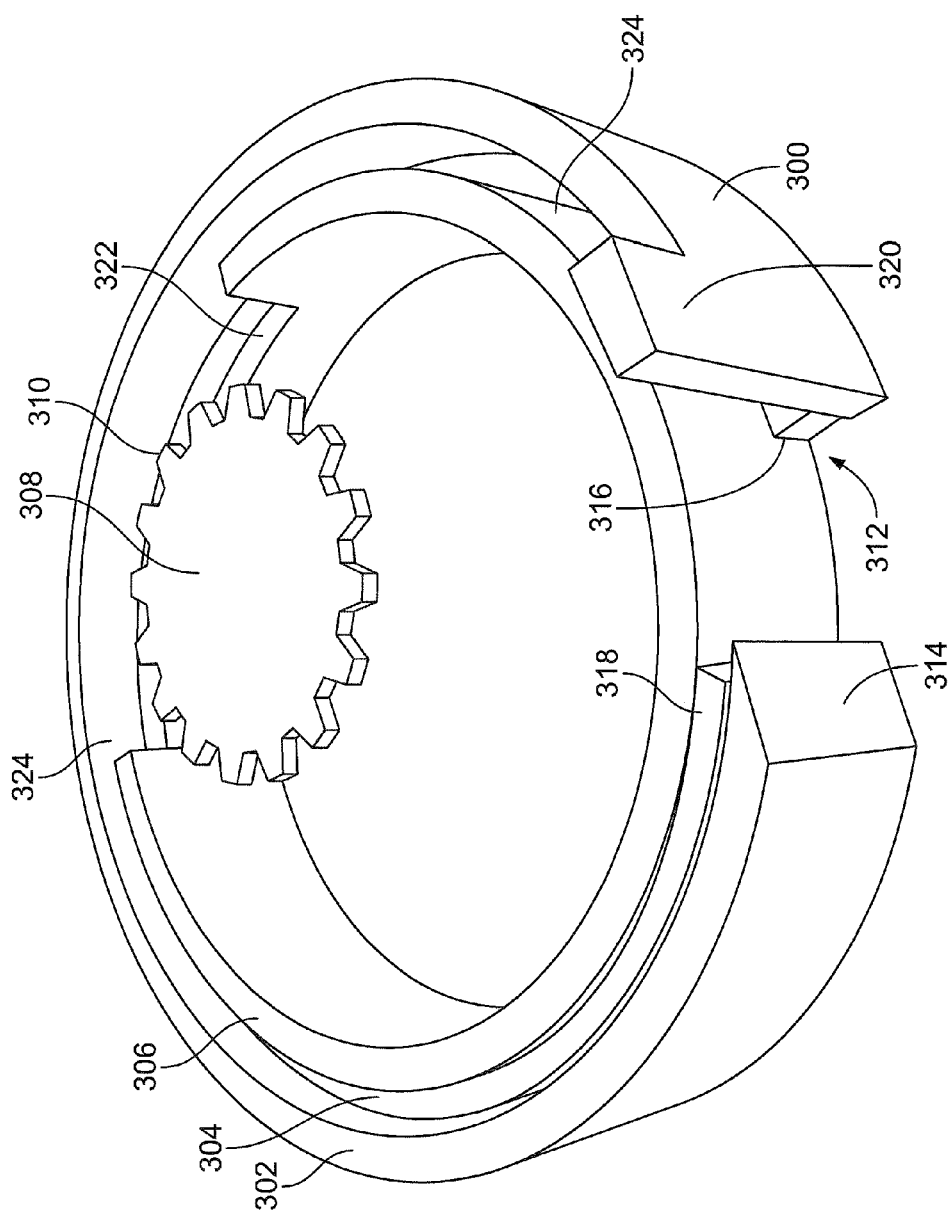
FIG. 3 is an isometric view of a circular sliding guide in accordance with aspects of the invention.

Referring next to FIG. 3, a sliding guide 300 for guiding a band to be helically linked and/or unlinked is shown. The illustrated sliding guide 300 is circular. The sliding guide 300 may include three concentric portions; an outer layer 302, an inner layer 306, and a ramp 304 formed between the outer layer 302 and the inner layer 306. In an embodiment, the outer layer 302 and the inner layer 306 are of a width that is substantially the same as the band (not shown) and are spaced apart such that the band fits between the outer layer 302 and the inner layer 306. The inner and outer layers 302 and 306 serve to guide the band as it is being assembled (e.g., being interlinked). As stresses in the band will naturally form a circular shape, the full guide is not critical to the functioning of the device. The outer layer 302 and the ramp 304 include an opening 312 through which the band may be fed into the sliding guide 300. In one embodiment, the outer layer 302 has an elevated wall 320 at the opening 312 to engage an end-cap (404 in FIG. 4) when the band is in a fully linked position and to facilitate the insertion of the protrusions into the recesses of the band when the band is being unlinked. The outer layer 306 may have a wedged portion 314 near the opening 312 to assist in guiding the band through the opening when the band is helically linked and to separate the protrusions from the recesses in the band when the band is helically unlinked. The ramp 304 is at the lowest point 316 at the opening 312 where the band is fed through and gradually inclines helically to the highest point 318 near the wedged portion 314 of the outer layer 302. In one embodiment, the bottom surface of the ramp 304 generates relatively low friction to facilitate the sliding of the band. In an embodiment, the bottom surface and/or inner walls 324 of the ramp 304 includes a low friction bearing material. In one embodiment, sets of roller bearings are lined up along the ramp 304 to reduce friction. Other suitable mechanisms to reduce friction in the ramp 304 will be understood by those of skill in the art from the description herein.

Also depicted in FIG. 3 is a driving mechanism 308 for helically linking and unlinking the band through the sliding guide 300. The driving mechanism 308 as depicted is a gear, although other suitable driving mechanisms may be utilized. In one embodiment, the center of the driving mechanism 308 is positioned non-concentrically with respect to the outer layer 302, ramp 304, and inner layer 306 of the sliding guide 300. The driving mechanism 308 may be configured to rotate (e.g., via a motor) in a first direction to helically link the band and configured to rotate in a second direction to helically unlink the band. In one embodiment, the driving mechanism 308 includes teeth 310 that extend through a gap 322 formed in the inner layer 306. The teeth 310 engage the band through the gap 322, exerting a force on the band to either helically link or unlink the band, as described with respect to FIGS. 4-6.

Figure 4:
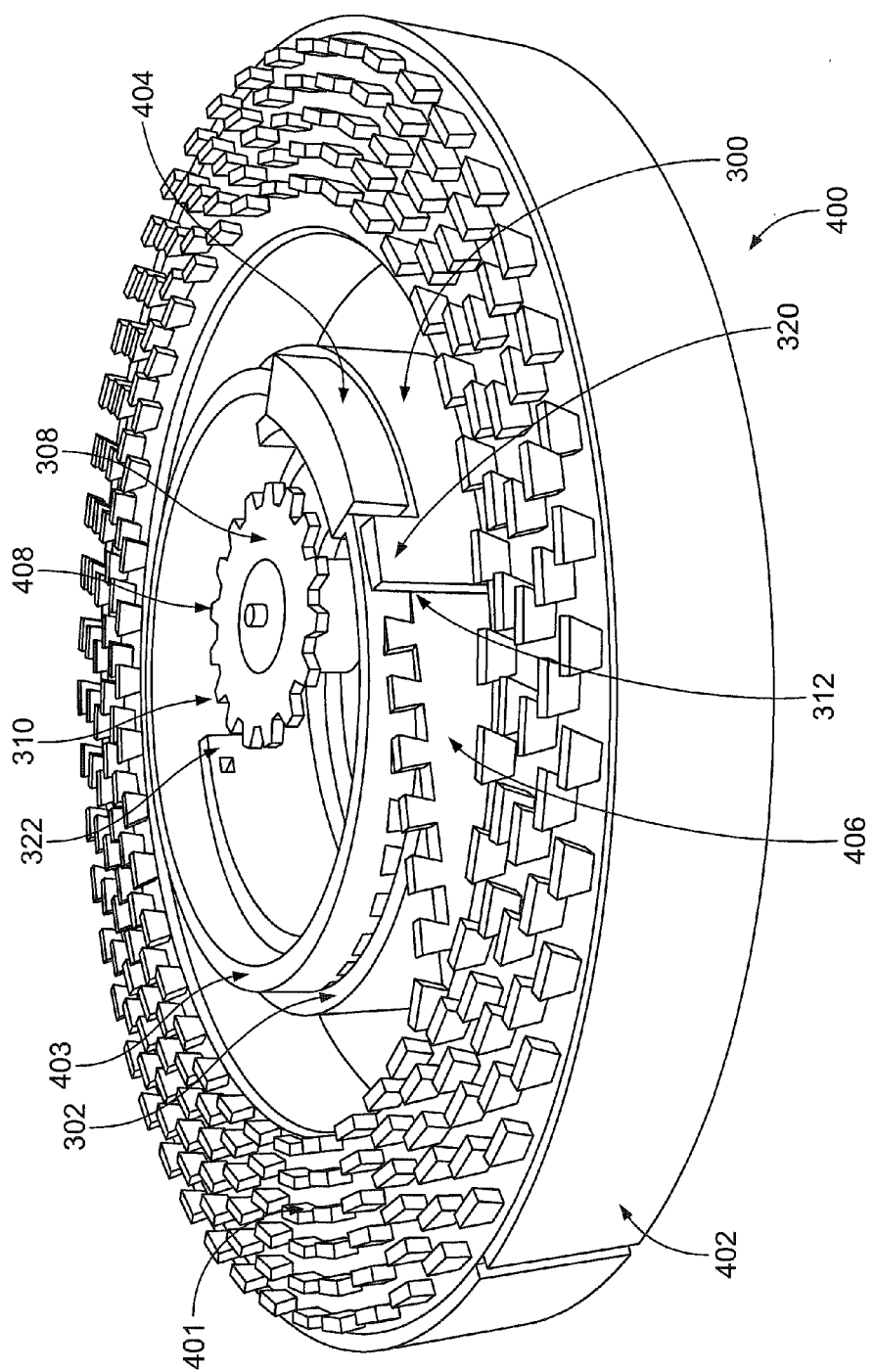
FIG. 4 is an isometric view of a linear motion device in an unwound position according to aspects of the invention.

The linear motion device is shown at an unlinked (fully retracted) position 400 in FIG. 4. The band 401 may be circularly enclosed in a band housing 402. An initial portion 403 of the band 401 that acts as the top portion of the linear motion device when the band is linked to itself out of the unwound position 400 is initially positioned within the ramp 304 of the sliding guide 300. In one embodiment, the linear motion device is held in the unlinked position 400 by way of an end-cap 404 that extends over the top surface of the sliding guide outer layer 302 and is substantially in contact with the elevated wall 320 of the outer layer 302. The end-cap 404 contacting the elevated wall 312 prevents the linear motion device from unlinking past the depicted unlinked position 400. The end-cap may be formed on the initial portion 403 of the band 401. Other suitable mechanisms to hold the linear motion device in an unlinked position will be understood by those of skill in the art from the description herein. A feeding portion 406 of the band 401 extends out of the band housing 402 and partially through the opening 312 of the sliding guide outer layer. The driving mechanism 308 is shown with teeth 310 extending through the gap 322 of the sliding guide inner layer 306 and engaging slots 408 formed on the inner surface of the initial portion 403 of the band 401.

Figure 5:
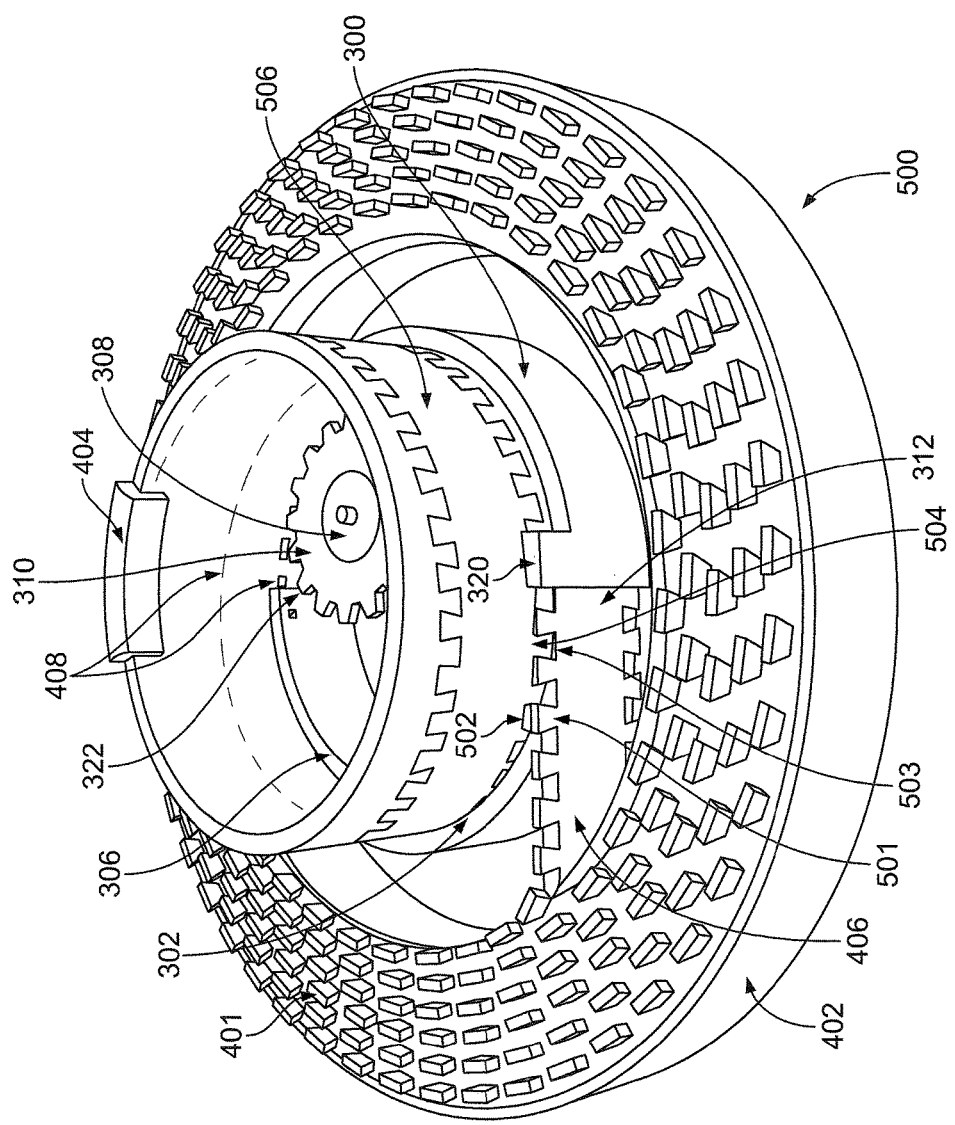
FIG. 5 is an isometric view of a linear motion device in a partially wound position in accordance with aspects of the invention.

Referring next to FIG. 5, the linear motion device is shown in a partially linked (partially extended) position 500. The driving mechanism 308 rotates in the first direction to helically link the band of the linear motion device to extend a tube to a desired linked position (e.g., partially linked position 500). When the driving mechanism 308 is rotated, the teeth 310 that are engaged in the slots 408 formed on the inner layer of the band 401 move the band through the opening 312 of the sliding guide 300 along the sliding guide ramp 304. The feeding portion 406 of the band 401 is moved from the band housing 402 along the wedged portion 314 of the sliding guide outer layer 302 through the opening 312. The protrusions 501 on the top side of the band 401 come into contact with the recesses 502 on the bottom side of the band 401 and the recesses 503 of the top side of the band 401 come into contact with the protrusions 504 on the bottom side of the band 401. As the band 401 is moved through the opening 312, the protrusions 501, 504 and recesses 502, 503 are interlocked by sliding against the elevated wall 320. As the driving mechanism 308 rotates in the first direction helically linking the band 401, the band 401 forms an interlinked zipper-like tube structure 506 that extends linearly outward. Advantageously, the helical linking of the band 401 along with the matching geometries of the protrusions 501, 504 with the recesses 502, 503 permit a single band linear motion device with a zipper-like tube structure that is resistive to both tensile and compressive forces even when helically linked to the maximum linear extension.

Figure 6:
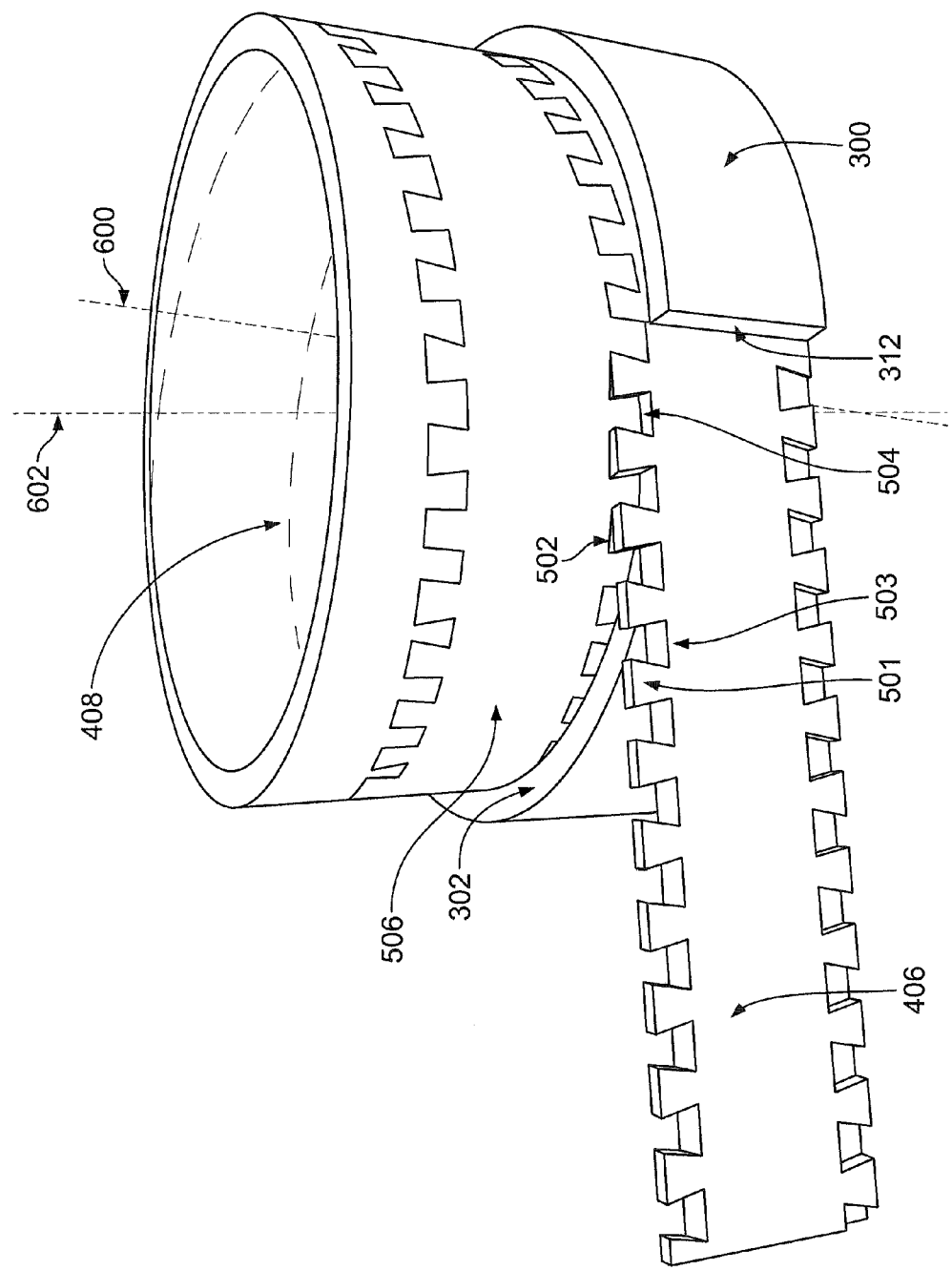
FIG. 6 is a partial view of a linear motion device in a partially wound position according to aspects of the invention.

In one embodiment, as depicted in FIG. 6, the outer layer 302 of the sliding guide 300 may be constructed without an elevated wall at the opening 312 (as depicted in FIGS. 3-5), such that the interlinking of the protrusions 501, 504 with the recesses 502, 503 may be facilitated by being moved through the ramp 304 of the sliding guide 300. In the embodiments depicted in FIGS. 4-6, the driving mechanism 308 may be configured to rotate about an axis 600 that is at an angle with respect to the axis of rotation 602 of the band through the sliding guide 300. Due to the helical linking of the band, the slots 408 also pass through the sliding guide in a helical shape, such that the axis of rotation 600 of the driving mechanism is angled to meet that of the slots 408 to allow the teeth of the driving mechanism to engage the slots 408. In one embodiment, the slots 408 are sized larger vertically, such that the teeth can engage the slots 408 with the driving mechanism rotating about the same angle as the band when the band is helically linked, such that axis 600 and 602 may be parallel. The driving mechanism 308 may include a locking mechanism preventing the rotation of the driving mechanism 308 in either the first direction or the second direction when the band 401 is linked into a tube of a desired length/position. The locking mechanism may be a brake or clutch actuator or can be a motor that can force or prevent rotation. Other suitable locking mechanisms will be understood by one of skill in the art from the description herein. The linear motion device may be unlinked by rotation of the driving mechanism 308 in the second direction. The teeth 310 of the driving mechanism 308 engage the slots 408 and move the band 401 helically out of the opening 312 of the sliding guide 300. The band 401, upon being pushed out of the opening 312, slide across the wedged portion 314 of the sliding guide 300. The wedged portion 314 moves the protrusions 501, 504 out of the recesses 502, 503, disengaging the protrusions 501, 504 from the recesses 502, 503, and guides the band 401 back into the housing 402.

Figure 7C:
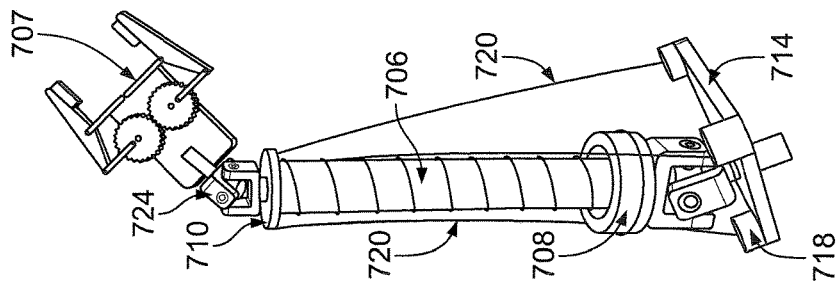
FIGS. 7A-7C depict positioning devices incorporating linear motion devices in accordance with aspects of the invention.
Figure 7B:
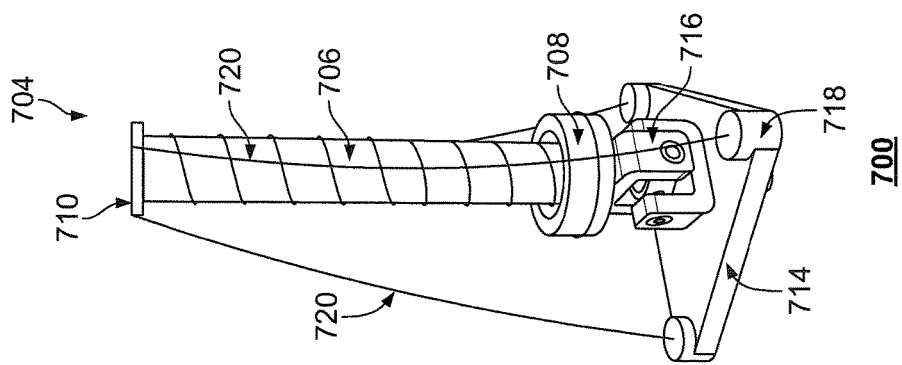
Figure 7A:
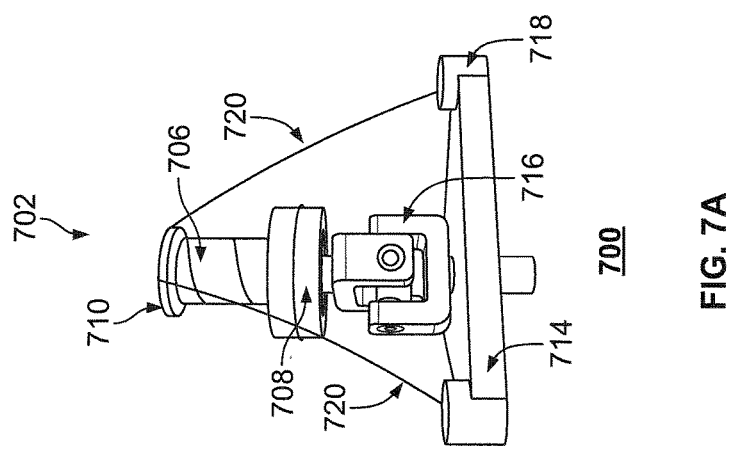

Referring next to FIGS. 7A-7C, a positioning device 700 incorporating the linear motion device with the zipper-like tube structure described above is depicted in a partially extended state 702 and a fully extended state 704 for use, e.g., as part of a robotic arm. The positioning device 700 includes the linear motion device 706. The linear motion device 706 has a housing 708 to enclose the band, sliding guide, driving mechanism, and other components as described with respect to FIGS. 1A-6. The distal end 710 of the linear motion device 706 may have a mount configured to receive an attachment (e.g., a gripper 707, a sensor, a camera, a pointer, etc.). Other attachments suitable for mounting to the end of the linear motion device will be understood by one of skill in the art from the description herein. The linear motion device 706 is mounted to a base 714 via a joint 716. The rotation joint 716 may be a universal joint, a spherical joint, etc., or any other joint to permit positioning of the linear motion device by movement through translational or rotational degrees of freedom.

In one embodiment, the base 714 includes three winches 718 positioned at the corners of the base 714 from which cables 720 are connected to the end 710 of the linear motion device 706. The cables 720 may be kept taut by way of a cable-winch system and/or a spring to bias the cables 720 such that the cables 720 are always kept in tension. When taut, the lengths of two of the three cables 720 combined with length of the extension of the linear motion device 706, uniquely determine the angles that the joint 716 will take (yaw and pitch). By controlling the lengths of these cables with the winches 718, the distal end 710 may be positioned on any point of a spherical section swept out by motion on joint 716. Controlling the extensions allows any translational point to be reached in polar coordinates within the limits of each joint. Advantageously, there are no singularities internal to this workspace. A third cable provides a force opposing the direction of the other two to ensure that the first two are always taut. An additional twisting degree of freedom for the positioning device 700 may be obtained by adding a joint between the base 714 and the linear motion device 708 that would thereby add a roll control to the yaw and pitch. In one embodiment, the universal joint 724 is driven by cables (not shown) that extend through the interior of the linear motion device 706 and are connected to winches and motors at the base 714 of the positioning device 700, thereby maintaining a low mass at the distal end 710. In an embodiment, a combination of joints and cable systems are utilized to allow the positioning device 700 up to six degrees of freedom. In one embodiment, the number of joints used in the positioning device 700 is the same as the number of cables used in the positioning device 700. Other suitable rotation and positioning mechanisms will be understood by one of skill in the art from the description herein.

The focus of proper positioning devices such as those described herein is typically on the position of the distal attachment. A technique that focuses on the rest of the positioning device 700 (e.g., the linear motion device 706) so they do not collide in cluttered environments is now provided. The positioning device 700 allows for easier control as collision can be easily determined. The swept volume of space made by the extension of the linear motion device 706 is minimal as it is the shortest distance between an initial position and a desired position. Since the positioning device 700 does not include an elbow or other rotation element as is commonly used in similar devices, no motion of an elbow or other rotation elements sweep out any other volume. As such, the positioning device 700 utilizing the linear motion device 706 can be made lighter, stiffer, and at a lower cost.

Forces applied by the positioning device 700 are seen at the distal end 710 or at the attachment (e.g., gripper 707), where the cables 720 and linear motion device 706 connect. The static forces are balanced between the cables 720 and the linear motion device 706, and any forces result in pure tension in the cables 720 and pure compression in the linear motion device 706. The linear motion device 706 is nominally strong in compression and the cables 720 are strong in tension. Therefore, the linear motion device 706 and cables 720, in combination, can be much lighter than an articulated robot arm of similar range of motion that is designed to resist arbitrary forces and torques.

In one embodiment, the cables 720 are used to apply a consistent compressive load to the linear motion device 706. In such embodiments, by varying the tension in the cables 720, but maintaining the same relative cable lengths, thereby the attachment position, the effective stiffness of the positioning device 700 can be varied, leading to higher precision control or tuned series-elastic control.

Figure 8B:
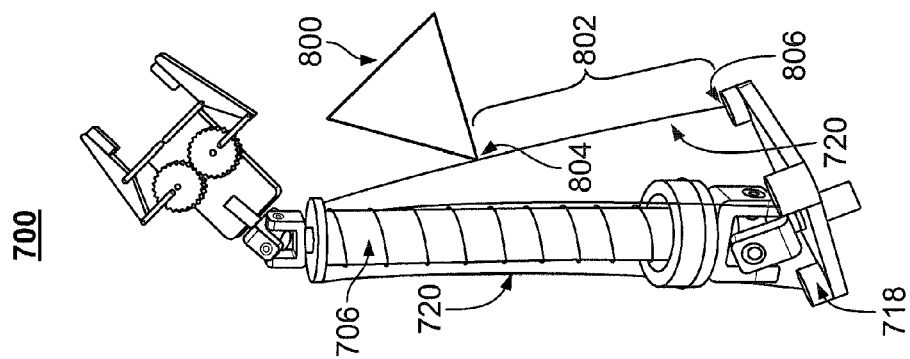
FIGS. 8A and 8B depict positioning devices with contact sensors according to aspects of the invention.
Figure 8A:
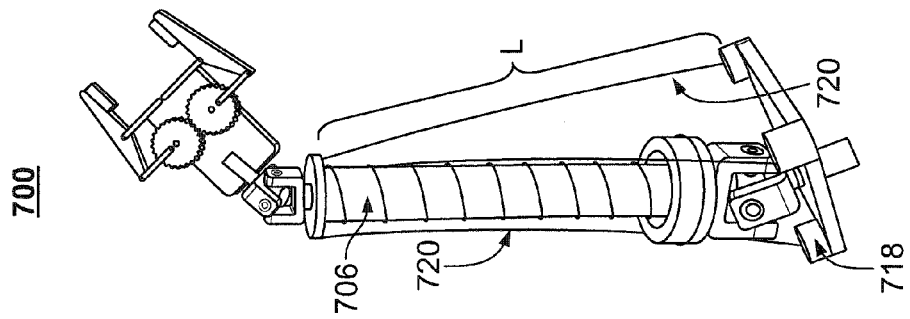

Advantageously, as depicted in FIGS. 8A and 8B, the cables 720 may also be used as sensors to detect contact (e.g., collisions) between the positioning device 700 and other obstacles. For example, the natural vibration frequency (f) of a wire (e.g., cables 720) of known dimensions (length L of the vibrating part), and material (linear density u) under a tension force (T), may be represented as:

$$f = \left(\frac{1}{2*L}\right) * \sqrt{\frac{T}{u}}$$

In a tensioned cable that has little damping, random disturbances will excite the cable to vibrate at a variety of frequencies, but the dominant frequency will be the natural frequency (f). In one embodiment, the cables 720 are paired with winches 718 that are equipped with an encoder so that the length of each cable is always known. The winches may also be equipped with force sensors (e.g., tension sensors). Disturbances that induce vibration in the cables 720 can come from normal motion of the positioning device 700 (e.g., vibrations from a motor, actively induced motion via a plucker which periodically strikes the wire, etc.). Sensors may be positioned to detect frequencies due to disturbances. In one embodiment, the sensor may be a readily available sensor such as a musical electric guitar "pick-up" that senses the moving metallic cable 720 in a magnetic field. In an embodiment, the sensor is a load cell. Other suitable sensors for detecting frequencies due to disturbances will be understood by one of skill in the art from the description herein.

When an object 800 comes into contact with a cable 720, the dominant frequency will no longer be associated with the length L of the cable 720, since the contact of the object 800 will limit the motion of the cable 720 and change the dominant frequency. The new frequency of the cable 720 will be associated with the length 802 between the contact point 804 and the cable connection point 806. By comparing the non-contact natural frequency and the measured dominant frequency and determining a large discrepancy, the comparison indicates that there is contact in the cable 720, and the location of the contact can be determined by substituting the newly measured frequency as f in the equation above and solving for L. It is contemplated that any number of cables may be used to change the coverage of sensing area when the tensions and lengths of the cables are known and managed.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A linear motion device comprising:
   a band comprising a sheet that is configured to be helically interlinked into a tube, the sheet including a plurality of protrusions, and defining a plurality of recesses that engage the plurality of protrusions to link the sheet with itself;
   a sliding guide configured to link and unlink the sheet, the sliding guide including an outer layer, an inner layer, and a ramp between the outer and inner layers having a helical incline to support a bottom portion of the sheet; and
   a driving mechanism in contact with the band, the driving mechanism configured to move the band through the sliding guide up the helical incline to link the sheet, thereby extending the tube, and to move the band through the sliding guide down the helical incline to unlink the sheet, thereby retracting the tube.

2. The linear motion device of claim 1, wherein the driving mechanism is configured to move the band down the ramp so as to cause the plurality of protrusions on a top portion of the sheet to disengage from the plurality of recesses on the bottom portion of the band sheet, thereby causing the tube structure to retract in the linear direction.

3. The linear motion device of claim 1, the band further comprising a plurality of slots and the driving mechanism comprising a gear including a plurality of teeth configured to engage the plurality of slots when the gear is rotated.

4. The linear motion device of claim 1, wherein the plurality of protrusions are castellated.

5. The linear motion device of claim 1, wherein the sliding guide is circular and the driving mechanism is a gear positioned non-concentrically with respect to the circular sliding guide.

6. The linear motion device of claim 1, wherein the outer layer comprises an elevated wall configured to interlink the plurality of protrusions with the plurality of recesses when the band is linked with itself.

7. The linear motion device of claim 1, wherein the outer layer comprises a wedged portion configured to disengage the plurality of protrusions on a top portion of the band from the plurality of recesses on the bottom portion of the band when the band is unlinked.

8. A positioning device comprising:
   a linear motion device comprising a structure configured to expand and contract along a linear direction;
   a base;
   at least one base joint connecting the linear motion device to the base; and
   at least one cable connected between a distal end of the linear motion device and the base;
   wherein the at least one cable is actuated by at least one winch positioned between the base and the distal end of the tube.

9. The positioning device of claim 8, wherein a number of the at least one base joints connecting the linear motion device to the base is equal to a number of the at least one cable connected between the distal end of the linear motion device and the base.

10. The positioning device of claim 8, wherein at least one of gravity or a spring is used to passively keep the cables taut.

11. The positioning device of claim 8, further comprising:
    at least one tension control cable configured to actively control the tension in the at least one cable connected between the distal end of the linear motion device and the base.

12. The positioning device of claim 8, further comprising at least one end joint positioned at the distal end of the linear motion device.

13. The positioning device of claim 12, further comprising an attachment mounted to the at least one end joint.

14. The positioning device of claim 13, wherein the attachment is a gripper.

15. The positioning device of claim 8, wherein the structure is a single band linking tube structure.

16. A method for determining whether contact is made on a cable in a positioning device, the method comprising the steps of:
    determining, by a processor, a natural vibration frequency of the cable;
    sensing, by at least one vibration sensor, a current dominant vibration frequency of the cable;

comparing, by a processor, the sensed current dominant vibration frequency of the cable with the natural vibration frequency of the cable; and determining, by a processor and based on the comparing step, a discrepancy between the sensed current dominant vibration frequency and the natural vibration frequency of the cable to indicate contact.

17. The method of claim 16, wherein the at least one vibration sensor comprises an electric guitar pick-up sensor.

18. The method of claim 16, further comprising the step of determining, by a processor and using the sensed vibration frequency as the natural vibration frequency, a location at which contact by an obstruction is made on the cable.

19. The linear motion device of claim 1, wherein the sheet comprises a top edge and a bottom edge, and the sheet defines a plurality of top recesses that extend into the top edge towards the bottom edge and are spaced from one another so as to define the plurality of protrusions therebetween.

20. The linear motion device of claim 19, wherein the sheet comprises first and second broadsides that are spaced opposite one another and that extend from the top edge to the bottom edge, and the plurality of recesses and the plurality of top recesses extend entirely through the sheet from the first broadside to the second broadside.

* * * * *